June 1, 1954 H. L. DANIELS ET AL 2,680,239

DATA SELECTION SYSTEM

Filed Feb. 26, 1952 7 Sheets-Sheet 1

INVENTOR
HOWARD L. DANIELS
JOHN W. HOGAN

BY Cushman, Darby & Cushman
ATTORNEYS

June 1, 1954

H. L. DANIELS ET AL 2,680,239

DATA SELECTION SYSTEM

Filed Feb. 26, 1952

7 Sheets-Sheet 2

INVENTOR
HOWARD L. DANIELS
JOHN W. HOGAN

BY Cushman, Darby & Cushman

ATTORNEYS

INVENTOR
HOWARD L. DANIELS
JOHN W. HOGAN
BY Cushman, Darby & Cushman
ATTORNEYS

June 1, 1954

H. L. DANIELS ET AL 2,680,239

DATA SELECTION SYSTEM

Filed Feb. 26, 1952

7 Sheets-Sheet 4

INVENTORS
HOWARD L. DANIELS
JOHN W. HOGAN

BY Cushman, Darby & Cushman

ATTORNEYS

June 1, 1954

H. L. DANIELS ET AL

DATA SELECTION SYSTEM 2,680,239

Filed Feb. 26, 1952

7 Sheets-Sheet 5

INVENTOR
HOWARD L. DANIELS
JOHN W. HOGAN

BY Cushman, Darby & Cushman

ATTORNEYS

INVENTOR
HOWARD L. DANIELS
JOHN W. HOGAN

BY Cushman, Darby & Cushman
ATTORNEYS

INVENTOR
HOWARD L. DANIELS
JOHN W. HOGAN

BY Cushman, Darby & Cushman
ATTORNEYS

Patented June 1, 1954

2,680,239

UNITED STATES PATENT OFFICE 2,680,239

DATA SELECTION SYSTEM

Howard L. Daniels, St. Paul, and John W. Hogan, Minneapolis, Minn., assignors to Engineering Research Associates, Inc., St. Paul, Minn., a corporation of Minnesota Application February 26, 1952, Serial No. 273,490

11 Claims. (Cl. 340—174)

This invention is concerned with data storage systems, and pertains in particular to apparatus for rapidly selecting a desired area or point from among a group of such areas or points positioned in a track or tracks around the periphery of a member such as a drum, disc or belt movable in cycles of travel. The invention is mainly concerned with magnetic recording and the following explanation will proceed in regard thereto.

The general theory of magnetic recording, reading and locating techniques in rotating drums, discs or belts is now well known in the art, but heretofore the techniques for the location of areas of the character described above has permitted only a single magnetic head in each track to perform transducing operations—either recording or reading—in only one area during a revolution of the member. Obviously, the access time involved in such a system can approach a maximum of one complete revolution. The present invention offers a means of substantially reducing the maximum access time to a desired bit of data without increase in rotational speed or necessity for elaborate "address" codes.

Basically the present invention contemplates the recording on the magnetizable member of positional data located on the member in relation to areas intended to receive or already containing some form of intelligence data or the like. So that the intelligence data areas to be located will not have to be carried to a single point for transducing operations, a plurality of transducing units are located at spaced points along the path of travel of the areas. When it is desired to locate certain areas, positional data is read at any point along the member and means are provided for determining the difference in position on the member of the area or areas to be located from the positional data as read from the member. With the difference thus determined, the transducing unit in closest anticipatory proximity to the area to be selected is enabled for transducing while the other transducing units remain unenabled.

It is accordingly an object of this invention to provide a selection system wherein the maximum access time is reduced to a small fraction of one revolution of the revolving member.

It is a further object of this invention to provide a selection system wherein each of a plurality of magnetic transducing heads may be responsive to but one item of recorded data during a revolution of a revolving record member.

It is still another object of this invention to provide a selection system wherein each of a plurality of recorded signals in one track may be detected by a selected one of a plurality of reading heads positioned over said track, the techniques also pertaining to the recording of signals in selected areas of the track.

It is still a further object of this invention to provide a selection system in which a plurality of areas subject to selection in any particular track pass beneath several transducing heads simultaneously, but in which only the circuitry of a preselected head is enabled for permitting a transducing operation by such head, the preselected head being the one in closest anticipatory proximity to the area at the moment of enabling.

It is yet another object of this invention to provide a selection system wherein a designated area will be subjected to a transducing operation at the next succeeding transducer unit adjacent which it will pass following the act of designation.

Further objects and the entire scope of the invention will become apparent from the following description and the appended claims.

The invention may be best understood with reference to the accompanying drawings, wherein an exemplary embodiment of the invention is shown.

Figure 3:
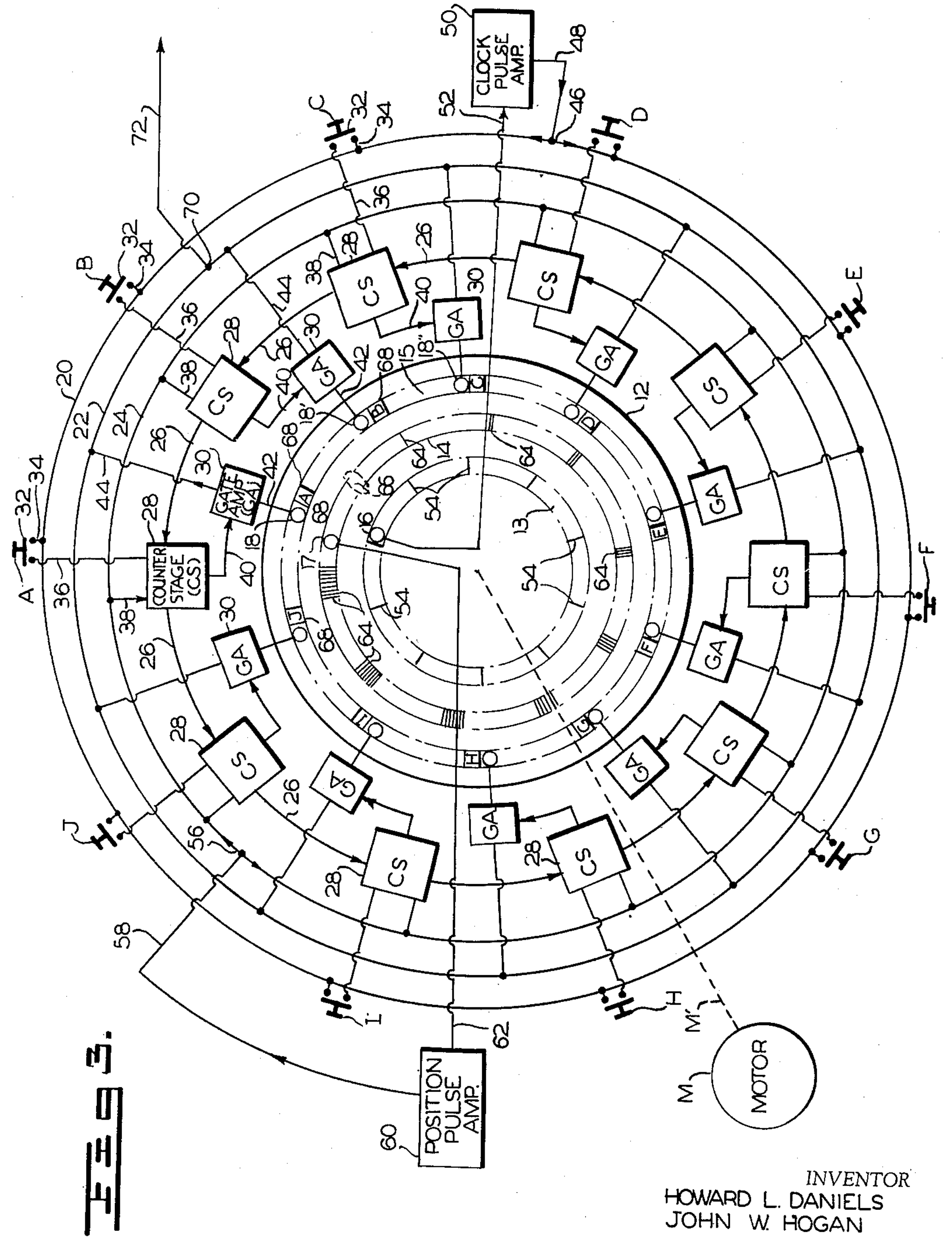

Figure 3 includes a disc with which the invention may be employed and also shows a complete block diagram of the circuits of the invention.

Figures 4–7 are partial block diagrams exhibiting the operation of the invention at various points during a typical cycle of operation.

Figure 8:
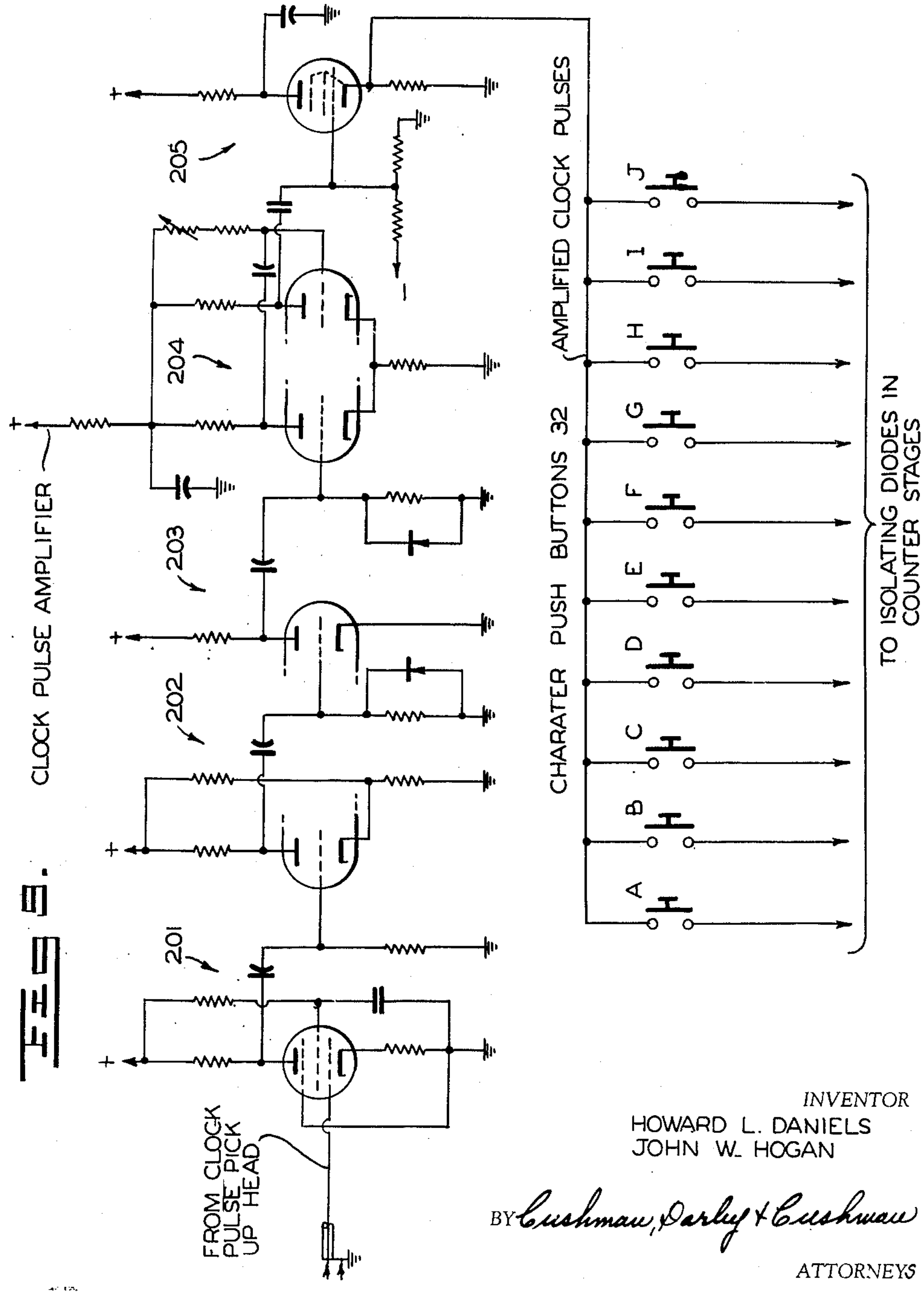

Figure 8 is a diagram of a position pulse amplifier of the type shown in Figure 3.

Figure 9:
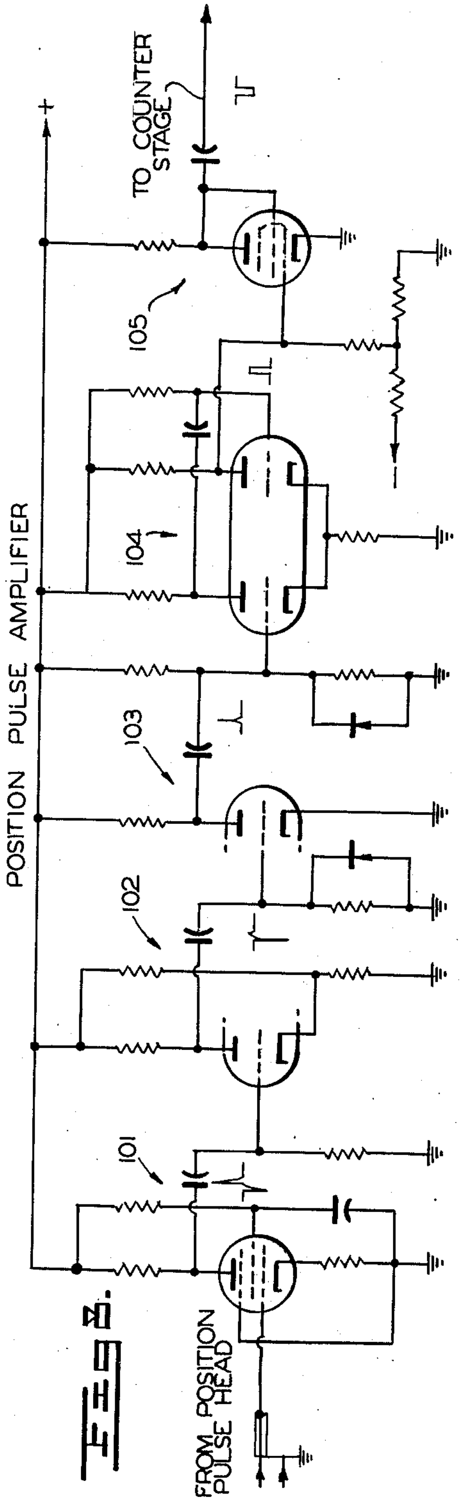

Figure 9 is a diagram of a clock pulse amplifier of the type shown in Figure 3.

Figure 10:
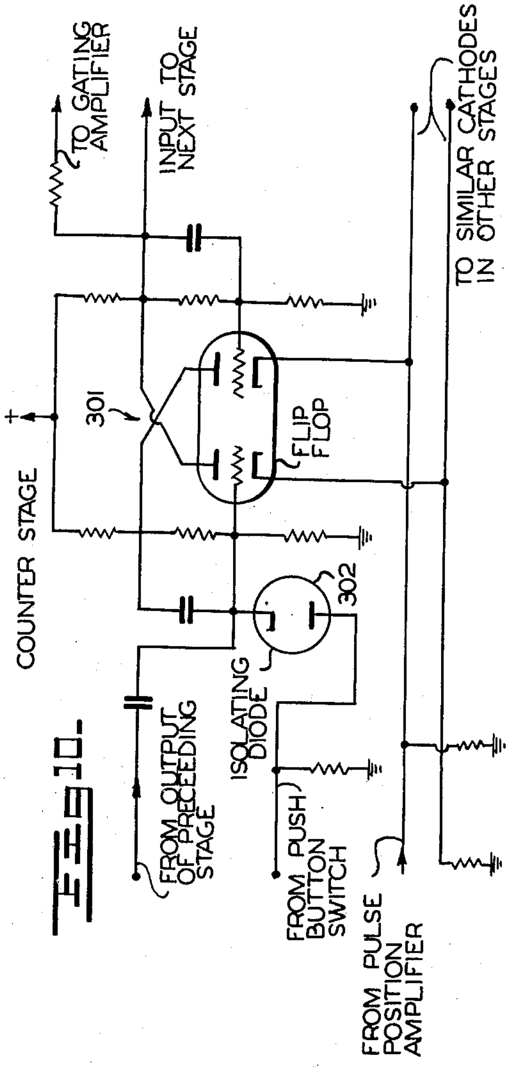

Figure 10 is a diagram of a counter stage of the type shown in Figures 3–7, and

Figure 11:
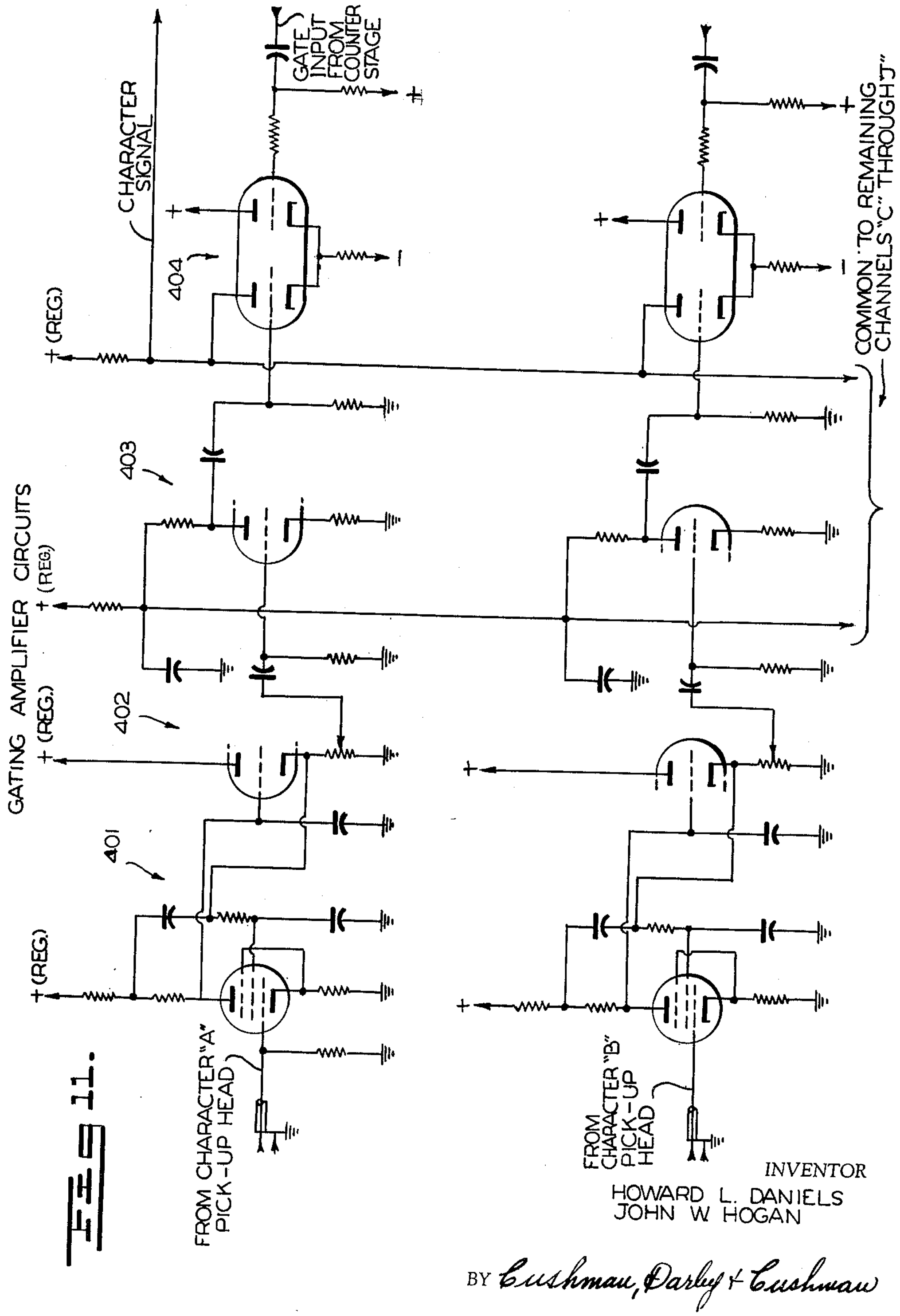

Figure 11 is a diagram of a gating amplifier of the type shown in Figures 1 and 3–7.

As indicated hereinabove, the invention pertains primarily to magnetizable record members which "rotate" or move in cycles of travel. Such members may be in the form of a rotatable drum 10 as shown in Figure 1, an endless belt 11 comprising magnetizable material as shown in Figure 2 or a disc 12 having a magnetizable surface as shown in Figure 3.

As will be clearly understood as this description proceeds, all of these types of recording members pertain equally to the present invention.

In the case of each type of record member there will be according to the present invention, a track 13 devoted to carrying what may be termed clock pulses, another track 14 devoted to what may be termed position pulses and one or more additional tracks 15 devoted to whatever variety of information is to be recorded in and/or removed from the magnetizable member.

Figure 1:
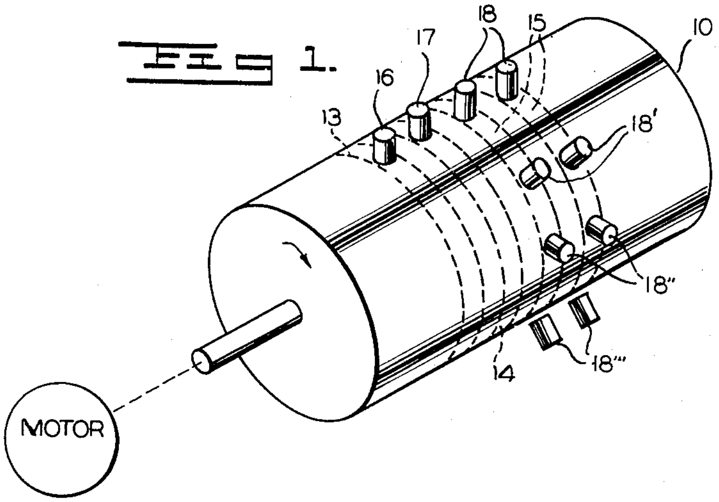
Figure 1 is a diagrammatic showing of a magnetizable drum with which the invention may be employed.
Figure 2:
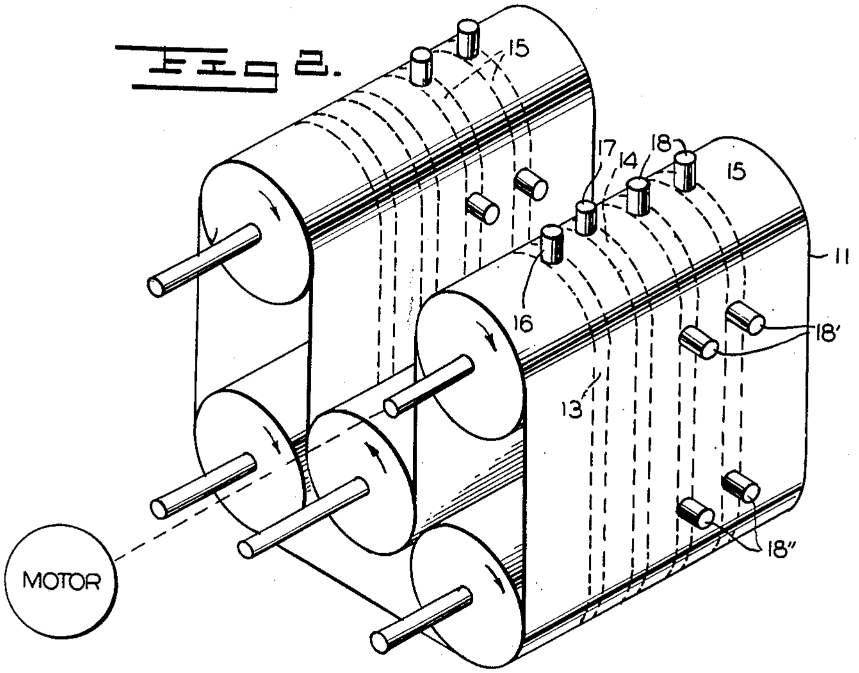
Figure 2 is a diagrammatic showing of a magnetizable belt with which the invention may be employed.

In general practice, magnetizable drums such as that shown in Figure 1 have found preference to elongated belts as in Figure 2 or discs as in Figure 3. Primarily, non-contact operation of transducing heads is preferred to avoid wear on the heads and magnetizable surface. Nevertheless, as little clearance between the heads and surface as possible is desired. Accordingly, it has been found that the drum type construction can be held to close tolerances since the drum may be machined while rotated in its own bearings and thereafter very little deviation will exist. By analogy, a belt where it runs over a pulley, as in Figure 2, has most of the aspects of a drum, although usually the tolerances involved are not as limited. A disc as in Figure 3, which may actually be considered the end of a drum, has many of the excellent tolerance characteristics of the cylindrical surface of a drum, but there is some disadvantage in the fact that each of the tracks will move at a different peripheral velocity. The difference in such velocities mean that heads cannot readily be interchanged and so forth.

Under the principles of the present invention, there will be a transducing head 16 positioned to operate in the clock pulse track 13, a head 17 positioned to operate in the position pulse track and a head or heads 18 positioned to operate in the intelligence track or tracks 15.

The short access time according to the present invention is to be attributed to the existence of a plurality of transducing heads positioned to operate along the path of travel of the intelligence tracks 15. For example, in Figures 1–3 there is shown a first set of intelligence transducers 18, a second set 18′, a third set 18″ and so forth at spaced positions along the intelligence tracks 15. While two tracks 15 have been shown in Figures 1 and 2, it will be understood that the invention may be practiced with only one of such tracks or on the other hand there may be a large number of such tracks. Usually, digital information or the like is carried as separate bits in a plurality of tracks, with the provision that a complete set of heads, one in each track, are simultaneously enabled to record or take off all of the bits of a piece of information in "parallel."

In Figure 3 it will be understood that the area between the dash lines and designated by the reference character 15 is intended to represent either one or more intelligence tracks. Accordingly, the rectangles designated 18, 18′, 18″ refer to the intelligence transducing heads and may be interprted as indicating either one or more heads, depending on the number of tracks involved.

Reference will hereinafter be made to Figure 3 and in addition to Figures 4–11 for an understanding of the complete invention. The description of the illustrated specific embodiment of the invention is made in connection with the disc of Figure 3 simply because a disc permits a more convenient layout of the associated circuitry. As the description proceeds, the use of either a drum or belt or the like will become clear.

Referring specifically to Figure 3, as above stated the clock pulse track 13, positional data track 14 and intelligence track or tracks 15 are indicated. In addition, the clock pulse transducer 16, positional data transducer 17 and the intelligence transducers 18 are so designated.

Surrounding the disc 12 in Figure 3 is a block diagram of circuitry which exemplifies the present invention. It will be noted from Figure 3 that the circuitry consists basically of ten circuit units which are interconnected by circumferentially extending lines 20, 22, 24 and 26. Each section of the circuit consists of a counter stage 28, gating amplifier circuit 30 and a pushbutton switch 32. The pushbutton switch 32 of each section has one terminal connected over line 34 to circumferential line 20 and has its other terminal connected over line 36 as one input to the counter stage 28. A second input to each counter stage is provided over line 38 connected with circumferential line 24, and an output of each counter stage is connected over line 40 as an enabling input to the gating amplifier circuit 30. The gating circuits 30 are each additionally supplied with an input from the intelligence track heads 18, this connection being over line 42. It will be understood that where transducers 18 are in fact multiplied for "parallel" operation, there will be an equal number of distinct gating circuits at 30.

The output of gating amplifier circuits 30 is connected in each section over line 44 to the circumferential line 22. The circumferential lines 26 serve as an interconnection between successive counter stages 28, proceeding in a counterclockwise direction about the circuit as shown in Figure 3.

The circumferential conductor 20 is connected as at junction 46 to a line 48 over which is available a series of clock pulses available from a clock pulse amplifier 50. Input pulses to amplifiers 50 are provided over a line 52 extending from the clock pulse transducer head 16 operating in the clock pulse track 13. The track 13 will have permanently recorded therein, in the present example, ten flux spots or cells equally spaced about the track. These cells are diagrammatically indicated in Figure 3 as lines transverse to the track 13 and are designated by reference character 54.

It will be understood that any number of circuit stages are possible, ten being described here only for purposes of illustration.

The circumferential line 24 is connected as at junction 56 to receive over a line 58 positional pulse information from a position pulse amplifier circuit 60. The input to circuit 60 is over a line 62 connected with the position pulse transducing head 17 operating in track 14. As indicated in Figure 3, the track 14 in ten spaced positions about the track will contain a group of discrete flux spots or cells here designated 64. There may be one sectional length of the track 14 being void of flux cells, this being designated by reference character 66. Then, at a proportionate distance along track clockwise as viewed in Figure 3, there will be a single cell 64. At the next divisional position, there are two cells 64 and so forth to a maximum of nine cells illustrated immediately to the right of head 17 in Figure 3.

In the intelligence track or tracks 15 there will be areas (conveniently illustrated in the drawing as rectangles) designated 68 which will be reserved for receiving and having reproduced therefrom some form of intelligence. For purposes of the present illustration the information contained within the area 68 will be referred to as characters. Generally speaking, the characters within the area 68 may represent any sort of data or the like and for the purposes of the present invention it is only necessary to understand that each of the areas 68 bear some predetermined position or relationship with the groups of positional data in track 14. The data within the areas 68 may be assigned any designation at random and in Figure 3 the letters A–J serve the purpose of such identification. Under the designations employed in Figure 3, it is simply required that the area A be known to lie in approximate radial relationship with the void space 66 of track 14, the area B have a similar relationship to the single positional cell clockwise from void 66, area C be related to the double cell in the positional track and so forth around the track.

It may further be noted at this point that the circumferential line 22 is connected as at junction 70 with a line 72 which may serve as an output. That is, as will appear more fully below, when a gating amplifier circuit is "open," data read from the associated intelligence transducer 18 will be available through line 44 and the line 22 to the line 72. However, it will be further understood that the present invention contemplates that line 72 may serve as an input of information. That is, the invention applies equally to systems wherein it is desired to record as well as read information from the intelligence tracks 15. In this instance, the gating amplifier circuits 30 may be replaced with or complemented by suitable writing circuits to be triggered at appropriate times over line 40 leading from the counter stage.

Suitable detail circuits for the counter stage, gating amplifier circuit and other circuits will appear in full hereinbelow.

It may now be assumed that the disc 12 has recorded therein the clock pulses and positional pulses as explained above. Also, it may be assumed that certain information exists in each of the data areas A–J. It will, of course, be understood that the data areas may extend lengthwise along track 15 to occupy substantially all of the allotted track, rather than being relatively small areas as indicated. A motor M is connected by shaft M' to drive the disc 12 at a suitable speed.

Having knowledge of the information contained within each of the areas A–J (or if recording is to be accomplished, what is to be placed therein) each of the pushbutton switches 32 may be designated in corresponding fashion. That is, as shown in Figure 3, the pushbuttons 32 are indicated as pertaining to items A–J.

Figure 4:
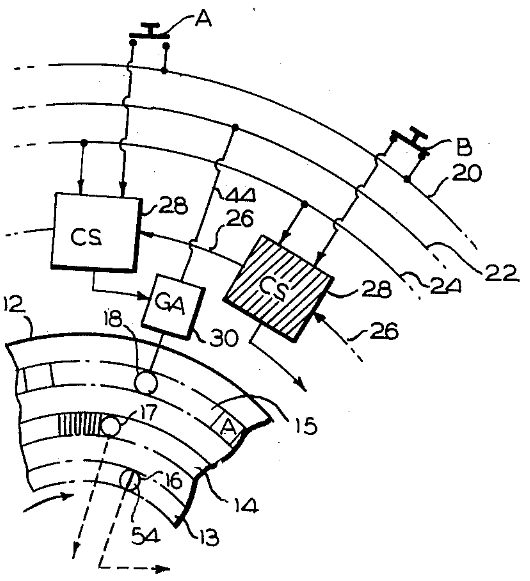

With the disc running at the selected speed due to energization of motor M, it will now be supposed that one wishes to produce on output line 72 the information recorded in area B on track 15. To obtain this action, the B pushbutton 32 will be actuated to close the circuit between circumferential line 20 and line 36 feeding counter stage 28 connected therewith. The immediate result may be understood with reference to Figure 4, which is a segmental view of the illustration in Figure 3. With the B pushbutton switch depressed, the complete ring counter comprising all ten of the counter stages 28 in series will be preset to a "count" representative of the "B" stage by reason of the counter stage associated with the B pushbutton being energized as soon as a clock pulse next appears on circumferential line 29 interconnected with the clock pulse amplifier 50. This will occur as indicated in Figure 4 when a clock pulse flux cell 54 passes the clock pulse transducer 16.

Figure 5:
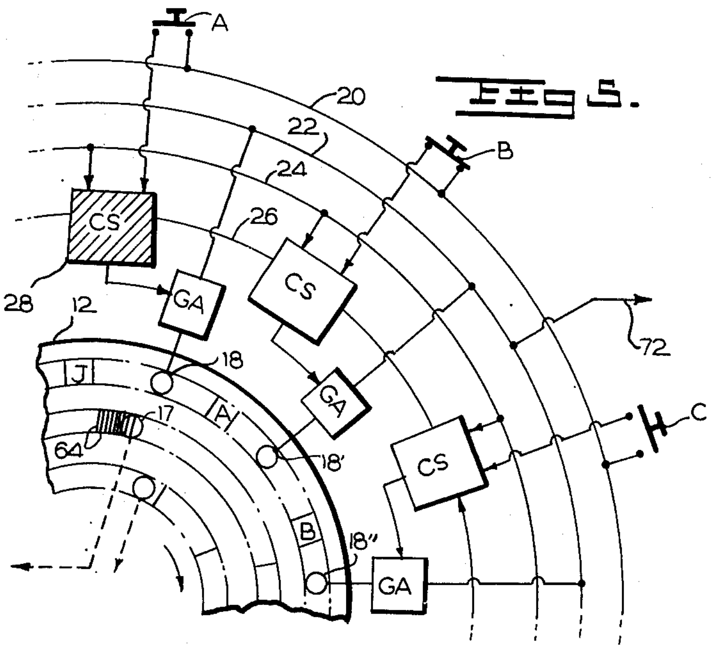
Figure 6:
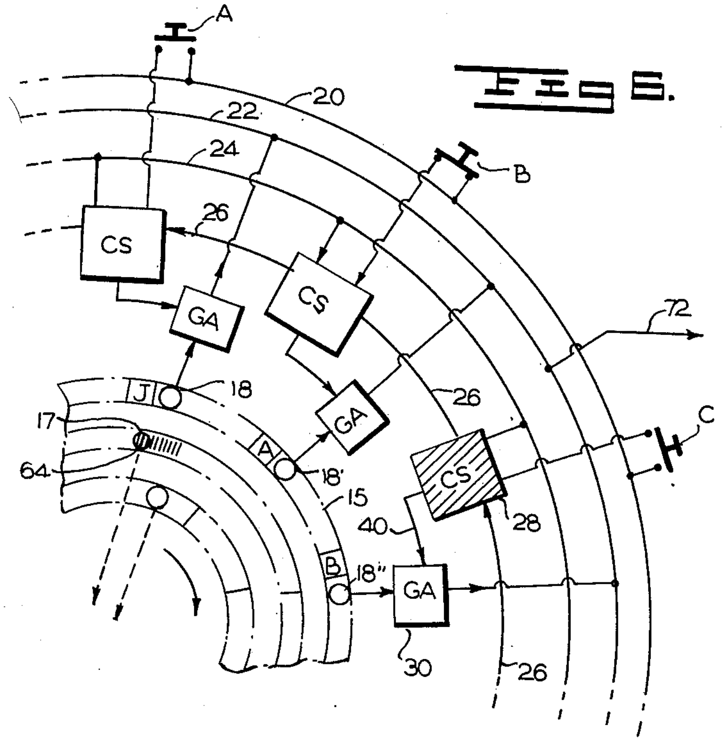
Figure 7:
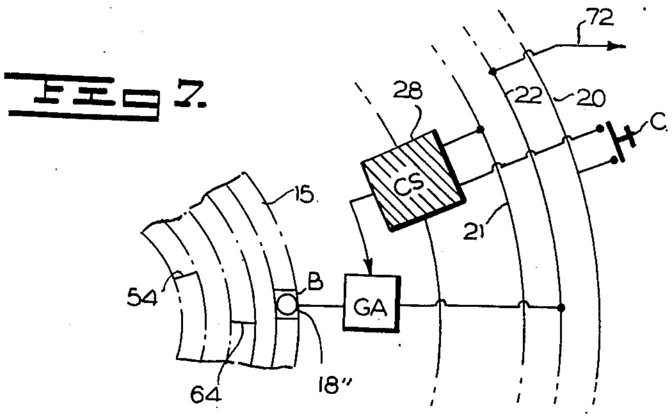

Next, as can be appreciated from Figures 5 and 6, each of the counter stages 28 will be energized simultaneously over input lines 38 as pulses developed through the position pulse amplifier 60 are applied to circumferential line 24. This sequence of pulses, caused by the positional data transducer 17 responding to the positional flux cells 64, will cause the active (cross hatched) stage of the counter to advance counterclockwise about the counter ring according to the number of positional cells or spots in the particular positional group which is energizing the transducing head 17. In the present instance, there are nine positional spots 64 passing the head 17 and this indicates to the circuitry that the disc 12 is in such position relative to positional head 17, that the desired B area of the intelligence track 15 has just passed the transducer 18 associated with the B stage (by coincidence in this description) and is in closest anticipatory proximity to the transducers 18 of section C.

As may be understood with reference to Figure 6, the passing of the final or ninth flux cell 64 beneath the positiontal transducer head 17 results in the energized stage of the ring counter having been transferred from one counter stage to the next counter-clockwise as in Figures 3–6 to the counter stage 28 located in the C section of the circuit. The grouping of the cells 64 is of such length that the C counter stage 28 is energized by the time the B area of intelligence track 15 has arrived in proximity to the intelligence transducer 18 associated with the C section, which is now energized so that the gating amplifier circuit 30 thereof is "open" by virtue of an energizing signal on the counter stage output line 40. Now, as can be appreciated from Figure 7, the data in the B area of track 15 is picked up by the transducer head 18 and produced on the output line 72.

It is of interst to note that so long as the "B" pushbutton is held closed, the "B" data will flow through line 72, as the data passes each set of heads 18.

From the foregoing it will be clear that the intelligence data B has been picked up in less than two-tenths revolutions of the disc, and it has not been necessary that this data have been subject to the delay up to a complete disc revolution before being read. Furthermore, it will be clear that all of the other gating amplifier circuits 30 in the other sections of the circuit have been disabled, so that no other information is avialable on the circumferential line 22 for transmission to the output line 72.

No limitation to the specific illustrated circuit is intended, it being clear that the invention is based on the general provision of suitable means such as a counter which is preset or conditioned according to the desired information, and then is advanced a differential amount according to the positional data next picked up to control the output enabling means at a point along the path of travel of the intelligence areas which will be next intercepted by the portion of the intelligence tracks containing the desired information.

Illustrative examples of suitable circuits for insertion into the circuit blocks of Figures 3–7 will now be described in connection with reference to Figures 8–11 of the drawings. The following circuits are not described in great detail, inasmuch as those skilled in the art will fully understand their construction and operation from the arrangement of circuit components set forth. It will also be realized that there are a great many specific circuits for accomplishing the function in each case.

Figure 8 illustrates a suitable pulse position amplifier circuit for insertion in the block 60 of Figure 3. As shown in Figure 8 it comprises an amplifier stage 101, a clipper stage 102, an inverter stage 103, a multivibrator stage 104 and a second amplifier stage 105. The legends in this figure indicate the connection of this circuit into the other circuits.

Figure 9 illustrates a suitable clock pulse amplifying circuit as shown in Figure 3. The circuit includes an amplifier stage 201, a clipper stage 202, an inverter stage 203, a mulivibrator stage 204 and a cathode follower stage 205. Legends are provided for indicating the connection with other circuits.

Figure 10 illustrates one counter stage 28 for insertion in the counter stage blocks shown in Figures 3–7. Each stage comprises a flip-flop circuit 301, an isolating diode 302 and the usual associated circuitry. The legends in this figure clearly indicate the interconnection of the various input and outputs from each counter stage.

Figure 11 shows two of the gating amplifier circuits 30 shown in Figures 3–7. For purposes of illustration, stages A and B are shown, with suitable legends indicating the interconnection to the common terminals of the remaining units.

Upon obtaining an understanding of the basic principles of the invention from the above described specific embodiment it will be apparent that many different embodiments of the invention are possible without departing from the scope thereof. Therefore, it is intended that all matter contained in the above description and shown in the accompanying drawings shall be interpreted as illustrative and not in a limiting sense. The true scope of the invention is to be determined by the appended claims.

What is claimed is:

1. Apparatus for locating predetermined areas on a member moving in cycles of travel to permit transducing operations within said predetermined areas, the apparatus comprising reading means for reading from the member positional data recorded in and located along the member in relation to said areas, a plurality of transducing units located in operative relation to the member in the path of travel of said areas, the units being positioned at spaced points along said path of travel of said areas, and means for enabling the transducing unit in closest anticipatory proximity to a predetermined area to be located, said enabling means comprising means for determining the difference in position along the member of the area to be located from the positional data read by said reading means.

2. Apparatus as in claim 1 wherein the member comprises magnetizable material and wherein the transducing units are electromagnetic.

3. Apparatus as in claim 1 wherein the areas lie along a single track on the member.

4. Apparatus as in claim 1 wherein the areas lie along a plurality of tracks on the member.

5. Apparatus as in claim 1 wherein the means for determining said difference in position comprise counter means presettable to represent the area to be located and arranged to be advanced in response to the positional data reading means.

6. Apparatus as in claim 1 wherein the member comprises magnetizable material and wherein the transducing units are electromagnetic, wherein the areas lie along a single track on the member, and wherein the means for determining said difference in position comprise counter means presettable to represent the area to be located and arranged to be advanced in response to the positional data reading means.

7. Apparatus as in claim 1 wherein the member comprises magnetizable material and wherein the transducing units are electromagnetic, wherein the areas lie along a plurality of tracks on the member, and wherein the means for determining said difference in position comprise counter means presettable to represent the area to be located and arranged to be advanced in response to the positional data reading means.

8. Apparatus for locating predetermined areas on a member moving in cycles of travel to permit transducing operations within said areas, the apparatus comprising means for generating clock pulses in accordance with spaced clock indications read from a clock track on the member, a ring counter comprising a plurality of stages, a plurality of means comprising switch means operable to preset the counter to a predetermined count representative of the area to be located, means connected with the clock pulse generating means for supplying clock pulses to each of the said plurality of means, whereby clock pulses may be supplied through a selected one of said means to preset the counter, means for generating positional pulses in accordance with groups of spaced indications read from a positional track on the member, the indications being located along the positional track in relation to said areas, means connected with the positional pulse generating means for supplying positional pulses simultaneously to each stage of the counter, whereby the counter may be advanced from its preset count to an advanced count, a plurality of units comprising means for performing transducing operations in predetermined areas along an intelligence track on the member, the just-mentioned units being positioned at spaced points along the path of travel of said track, a plurality of gating means, each one connected at a first side thereof with one of said units and connected at the other side thereof with a common terminal, and a plurality of enabling means, each one connected between one gate means and a counter stage for enabling the gate means associated with the counter stage which is active with the counter at said advanced count, the arrangement being such that the advance in count serves to enable the gating means of the unit comprising the transducing means in closest anticipatory proximity to the area to be located.

9. Apparatus for locating predetermined areas on a member moving in cycles of travel to permit transducing operations within said areas, the apparatus comprising means comprising clock pulse reading and amplifying means for generating clock pulses in accordance with spaced clock indications read from a clock track on the member, a ring counter comprising a plurality of stages, a plurality of means comprising switch means operable to preset the counter to a predetermined count representative of the area to be located, means connected with the clock pulse generating means for supplying clock pulses to each of the said plurality of means, whereby clock pulses may be supplied through a selected one of said means to preset the counter, means comprising positional pulse reading and amplifying means for generating positional pulses in accordance with groups of spaced indications read from a positional track on the member, the indications being located along the positional track in relation to said areas, means connected with the positional pulse generating means for supplying positional pulses simultaneously to each stage of the counter, whereby the counter may be advanced from its preset count to an advanced count, a plurality of units comprising means for performing transducing operations in predetermined areas along an intelligence track on the member, the just-mentioned units being positioned at spaced points along the path of travel of said track, a plurality of gating means, each one connected at a first side thereof with one of said units and connected at the other side thereof with a common terminal, and a plurality of enabling means, each connected between one gate means and a counter stage for enabling the gate means associated with the counter stage which is active with the counter at said advanced count, the arrangement being such that the advance in count serves to enable the gating means of the unit comprising the transducing means in closest anticipatory proximity to the area to be located.

10. Apparatus as in claim 8 wherein the member comprises magnetizable material and wherein the transducing units are electromagnetic.

11. Apparatus as in claim 9 wherein the member comprises magnetizable material and wherein the transducing units are electromagnetic.

References Cited in the file of this patent

UNITED STATES PATENTS

| Number | Name | Date |
|---|---|---|
| 2,519,725 | White | Aug. 22, 1950 |
| 2,549,071 | Dusek et al. | Apr. 17, 1951 |
| 2,564,403 | May | Aug. 14, 1951 |
| 2,587,532 | Schmidt | Feb. 26, 1952 |
| 2,614,169 | Cohen et al. | Oct. 14, 1952 |